United States Patent [19]

Murray

[11] Patent Number: 5,737,498

[45] Date of Patent: Apr. 7, 1998

[54] PROCESS AUTOMATION METHOD AND APPARATUS

[75] Inventor: Carl Murray, Indianapolis, Ind.

[73] Assignee: Beckman Instruments, Inc., Indianapolis, Ind.

[21] Appl. No.: 500,765

[22] Filed: Jul. 11, 1995

[51] Int. Cl.$^6$ .................................................. G06F 15/00
[52] U.S. Cl. ................................. 395/81; 395/80; 395/51
[58] Field of Search .................................. 395/500, 575, 395/800, 51, 80, 81, 50

[56] References Cited

U.S. PATENT DOCUMENTS

| | | | |
|---|---|---|---|
| 5,053,970 | 10/1991 | Kurihara et al. | 395/208 |
| 5,136,705 | 8/1992 | Stubbs et al. | 395/183.03 |
| 5,155,679 | 10/1992 | Jain et al. | 364/468.13 |
| 5,155,836 | 10/1992 | Jordan et al. | 395/500 |
| 5,212,635 | 5/1993 | Ferriter | 395/211 |
| 5,241,465 | 8/1993 | Oba et al. | 395/208 |
| 5,241,482 | 8/1993 | Iida et al. | 364/468.17 |
| 5,270,626 | 12/1993 | Choi | 318/561 |
| 5,289,385 | 2/1994 | Grandone | 364/497 |
| 5,301,336 | 4/1994 | Kodosky et al. | 395/800 |
| 5,355,439 | 10/1994 | Bernstein et al. | 395/82 |
| 5,366,896 | 11/1994 | Margrey et al. | 436/48 |
| 5,402,350 | 3/1995 | Kline | 364/468.07 |

OTHER PUBLICATIONS

Hidde et al. "An AI-based manufacturing design rule checker and path optimizer for PCB production preparation and manufacturing," Manufacturing Tech. Symp, 11th IEEE/CHMT, International Electronics (Abstract), Dec. 31, 1991.

*Primary Examiner*—Tariq R. Hafiz
*Assistant Examiner*—Ji-Yong D. Chung
*Attorney, Agent, or Firm*—Ice Miller Donadio & Ryan; Paul B. Overhauser

[57] ABSTRACT

The invention provides in one aspect a method for generating a schedule for the performance of a process, wherein the process comprises a plurality of steps. Each step of the process comprises one or more operations. The method comprises first obtaining input containing information defining the process and then generating from the input a series of nodes definitions, each node definition corresponding to at least one step of the process. Each node definition includes duration and device usage information relating to at least one step and further includes information identifying at least one previous step and at least one subsequent step. Then, one or more tasks are generated using the series of node definitions, each task comprising at least one step of the process, such that every step in the process is associated with at least one task. Once the tasks are defined, a schedule of operations is generated using the generated tasks and the node definitions, said schedule of operations corresponding to the defined process. In a preferred embodiment, the method of the present invention employs a graphical user interface to obtain the input. Also, preferably, the graphical user interface consists of icons representative of operations that may be performed on the work sample.

28 Claims, 5 Drawing Sheets

Microfiche Appendix Included
(6 Microfiche, 322 Pages)

PROCESS AUTOMATION METHOD AND APPARATUS

MICROFICHE APPENDIX

A microfiche appendix of 6 fiches with 322 frames containing computer source code is provided.

FIELD OF THE INVENTION

This invention relates to the field of process automation, and, in particular, to defining and scheduling processes to be performed on a work sample.

BACKGROUND OF THE INVENTION

Automation is often utilized in manufacturing and laboratory environments to reduce the time required to perform processes, such as, for example, manufacturing processes, testing processes, or substance analyses. Such processes typically involve one or more work samples, such as for example, a chemical sample, that must be operated upon by a plurality of devices, such as laboratory or processing equipment. In automating such processes, a robot or a conveyor is typically employed to move the work sample from one piece of equipment to the next after each operation of the process has been completed. A process may typically be subdivided as a series or sequence of steps. A step relates to one or more operations that are performed upon the work sample in order to analyze or effect change thereupon. Such operations may include incubating, mixing, or optically measuring the work sample.

For example, in a first step of an exemplary automated laboratory assay process, a first piece of equipment, such as an incubator, performs an operation on the work sample. After that operation is completed, in a second step, a second piece of equipment may perform another operation on the work sample.

In some systems, such as laboratory assay systems, the processes that are performed need to be frequently redefined. To facilitate such frequent redefinition, process automation systems are currently available that allow a process manager to define processes on a computer. Such process automation systems typically include a user interface, a scheduling device for coordinating the operations of the defined process, and a process control device that controls the actual operations of the process once they have been coordinated.

There are several drawbacks to the currently available process automation systems. First, the currently available systems lack a user interface that can provide the process manager with an intuitive graphical display of the process being defined. For example, many system user interfaces merely allow the process manager to define textually the steps in a process. Consider the process illustrated in Table 1, which illustrates the operations to be performed on two work samples.

TABLE 1

Step 1 - incubate Sample 1 at 30° C. for 00:30:00
Step 2 - prepare Sample 2
Step 3 - mix 10% of Sample 1 into Sample 2
Step 4 - shake Sample 2 for 00:00:20
Step 5 - incubate Sample 1 at 25° C. for 00:05:00
Step 6 - incubate Sample 2 at 20° C. for 00:05:00

While the textual representation of the exemplary process in Table 1 is relatively straightforward, it is clear that such a representation of more complex assays would render such assays difficult to comprehend or visualize. The above method further lacks an intuitive approach because adjacent steps in the process alternate between performing operations on Sample 1 and on Sample 2.

At least one process automation technique is known that incorporates a graphical representation of the laboratory equipment in order to assist the process manager in visualizing the process being defined. For example, U.S. Pat. No. 5,355,439 ("Bernstein, et al") shows an apparatus that graphically displays a laboratory bench top and a robotic device. The graphically displayed bench top provides a frame of reference in which to locate the work sample or work samples with respect to equipment that is deployed on the bench top. The process manager may define a task or process by pointing and "clicking" on an icon representing a step of the process and then "dragging" that icon to the location of a desired piece of equipment on the work bench image. One drawback of the Bernstein et al. apparatus is that it does not provide a graphical representation of the entire process, but rather only the work bench top. As a result, Bernstein et al. lacks an intuitive display for facilitating the creation of new processes or even the revision of existing processes.

Another drawback of currently available devices is their inability to allow a user to easily define and schedule interdependent processes or tasks. To illustrate this drawback, consider the example in Table 1. The steps that operate on Sample 1 and the steps that operate on Sample 2 may be thought of as two separate tasks that are interdependent. The tasks are interdependent because, for example, the operations on Sample 2 cannot be completed without interaction with Sample 1. The prior art systems, while capable of defining and scheduling multiple independent tasks, are not capable of intuitively defining and scheduling such interdependent tasks.

For example, the apparatus described in Bernstein, et al. is capable of scheduling several tasks, each comprising a number of steps, such that they may be performed contemporaneously on the same laboratory equipment. To this end, the Bernstein, et al. apparatus includes a scheduler that time-interleaves the tasks in order to advantageously allocate the equipment resources between the steps of the several tasks. Bernstein, et al., however, is incapable of defining and scheduling interdependent tasks, and thus can not treat the process described in Table 1 as two distinct tasks. The Bernstein et al. apparatus and other prior art systems must treat two or more interdependent tasks as one linear task, similarly to the way the process is described in Table 1 above. The drawback of such treatment as a linear task is that the optimization techniques of the scheduler can not be used to interleave the steps of the tasks. Such interleaving must be manually defined by the process manager.

For complex tasks, manual interleaving or scheduling will rarely produce as efficient a schedule as computer automated scheduling. Furthermore, manual scheduling of complex tasks, even if producing as efficient a schedule, will typically require more time than automated scheduling. Consequently, current process automation techniques lack an intuitive representation of processes and lack an efficient manner in which to interleave steps of multiple interdependent tasks.

OBJECTS OF THE INVENTION

One object of the invention is to provide a process automation method and apparatus in which a process is graphically represented in an intuitive manner to facilitate process creation and revision.

Another object of the invention is to provide a process automation method and apparatus in which interdependent tasks may be defined in a way that allows a scheduler to automatically interleave steps and operations of the interdependent tasks.

Another object of the invention is to provide a process automation method and apparatus that includes a graphical process definition method that allows a process manager to define interdependent tasks in an intuitive and straightforward manner.

Another object of the invention is to provide a fully automated apparatus for defining and performing a process on a work sample using a plurality of devices.

SUMMARY OF THE INVENTION

The foregoing and other objects of the present invention are accomplished by a process automation apparatus that defines, displays and schedules processes in an intuitive manner, particularly those processes that include multiple interdependent tasks.

One embodiment of the invention includes a method for generating a schedule for the performance of a process, wherein the process comprises a plurality of steps, and each step consists of one or more operations. The method comprises first obtaining input containing information defining the process and then generating from the input a series of defined nodes, each node corresponding to at least one step. Each node definition includes duration and device usage information relating to the corresponding step and further includes information identifying at least one previous step and at least one subsequent step. Then, one or more tasks are generated using the series of node definitions, each task comprising at least one step of the process, such that every step in the process is associated with at least one task. Once the tasks are defined, a schedule is generated using the generated tasks and the node definitions. The generated schedule comprises an advantageous sequence of operations performed to carry out the defined process.

In a preferred embodiment, the method of the present invention employs a graphical user interface to obtain the input. Also, preferably, the graphical user interface consists of icons representative of operations that may be performed on the work sample.

DETAILED DESCRIPTION

Figure 1:
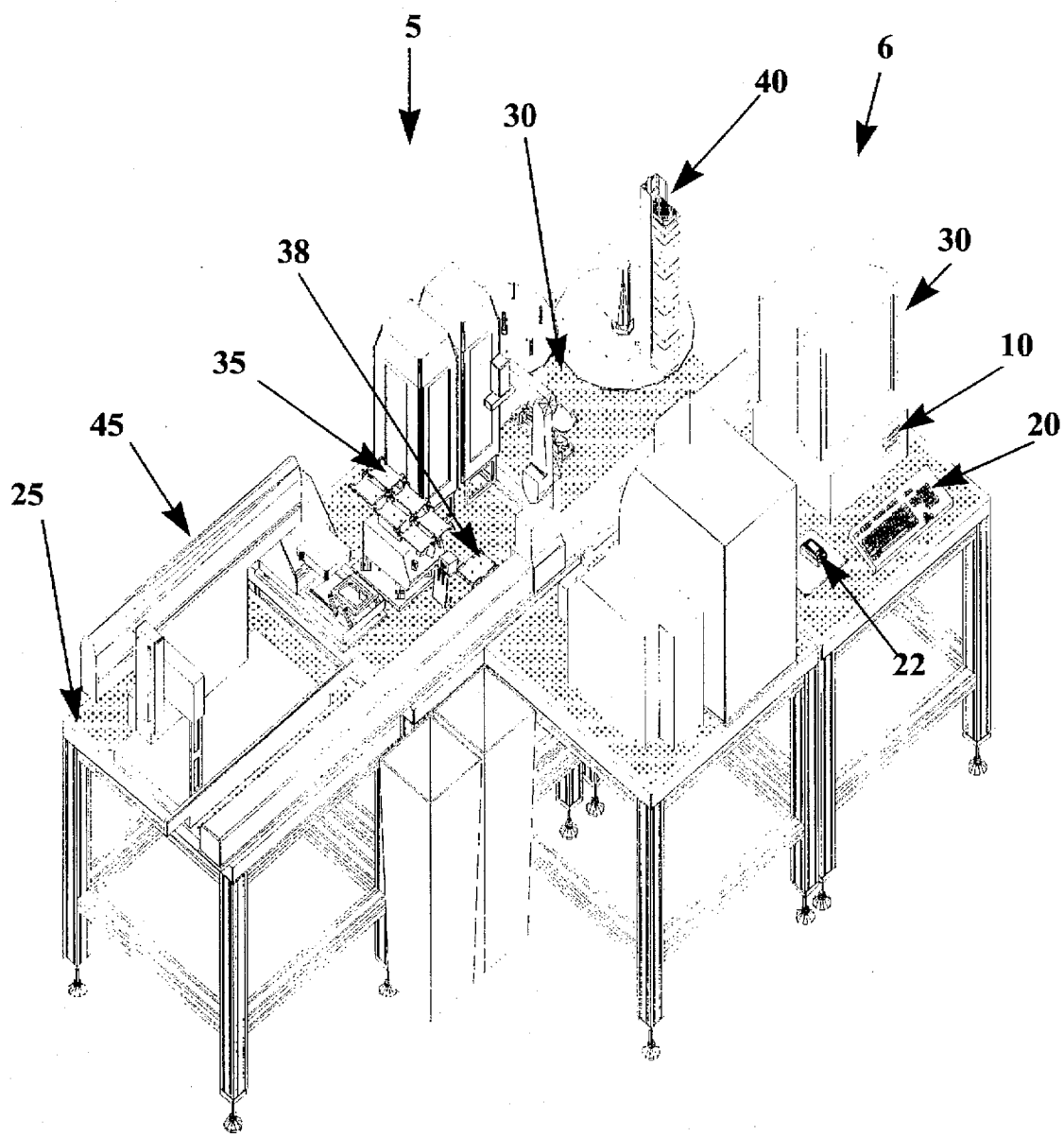
FIG. 1 shows a diagram of an automated system for performing a process in accordance with the present invention.

FIG. 1 shows a diagram of an automated system 5 for performing a process in accordance with the present invention. According to one embodiment of the present invention the automated system 5 is an automated laboratory assay system that performs multiple operations on a work sample in order to prepare, analyze or otherwise manipulate the sample to achieve a desired goal, such as the measurement or some chemical or physical property. In this context, a work sample may be multiple items of interest contained within a multiple-well microtiter plate.

The automated system 5 in FIG. 1 includes a process automation apparatus 6 comprising a computer processing unit (CPU) 10, a keyboard 20, a mouse 22, and a visual display 30. The CPU 10 may suitably be a processing unit of a personal computer, mini-computer, mainframe computer or other suitable computer processor unit. Preferably, the CPU includes at least sufficient microprocessing power to support a windows-type user interface, such as, for example, an Intel 80386 microprocessor. The visual display 30 may suitably be a cathode ray tube (CRT) display, LCD display or other display having at least minimal graphics capacity, but preferably sufficient graphics capability to support a windows-type user interface, such as, for example, a display of VGA quality or better.

The automated system 5 further comprises a work bench 25 upon which a plurality of processing devices consisting of laboratory equipment are located. The plurality of processing devices include a robotic device or robot 30, a sample shaker 35, an incubator 38, a sample storage device 40, and a mixer or liquid handler 45. Each of the robot 30, the sample shaker 35, the incubator 38, and the liquid handler 45 are operably connected to the CPU 10, preferably through RS-232 links, in order to receive command signals therefrom.

The robot 30 is operable to manipulate one or more samples in order to move the samples from one device to another. The movements of the robot 30 are typically controlled by command signals from the CPU 10. Several suitable commercially available devices exist, including the model Orca Robot available from Hewlett-Packard, Little Falls, Del. The sample shaker 35 is operable to vibrate, dither and or shake a work sample. Several suitable devices exist, including the commercially available Bellco Plate Shaker. The plate storage device 40 may suitably be a Room Temperature Incubator plate hotel available from Sagian, Inc., Indianapolis, Ind. The liquid handler 45 is a device operable to perform a number of pipetting and mixing operations. Suitable liquid handling devices include the commercially available model Biomek 2000 available from Beckman Instruments, Fullerton, Calif., and the models 5051 or 8051 available from Tecan U.S., Inc., Research Triangle Park, N. C.

The inclusion of the above-described equipment is given by way of example only, and the automated system 5 may suitably include other equipment useful in such systems, including but not limited to plate readers, plate washers, bar code readers, and balances. Furthermore, the plurality of devices need not be physically located on a singular work bench, but rather physically located within or electronically connected to a defined work area.

In the practice of the present invention, a process manager defines a process which is provided as input to the process automation apparatus 6. The defined process comprises a plurality of steps. Each step is typically associated with an analysis or treatment operation, such as incubation or mixing, and is further associated with one or more robotic operations for transporting the work sample to and from the location of the analysis or treatment operation. The process automation apparatus 6, operating in accordance with the present invention as discussed below in connection with FIG. 3, determines from the input a sequence of operations that advantageously utilizes and allocates the available equipment to perform the defined process. Once the sequence of operations is defined, the process automation apparatus 6 generates a process code sequence which is used to command the various devices on the work bench 25 to perform the defined process.

Figure 2:
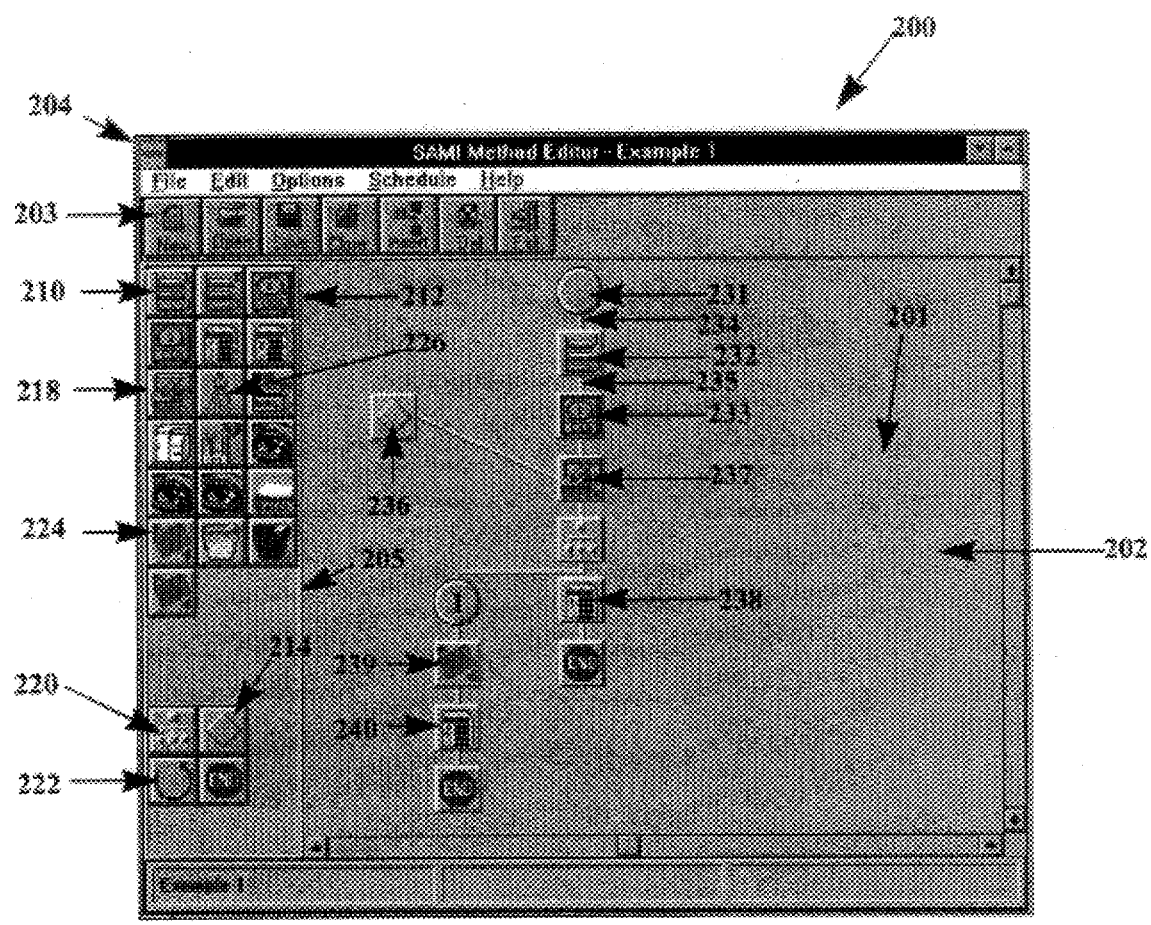
FIG. 2 shows an exemplary user interface screen display of a process automation apparatus operating according to the present invention.

FIG. 2 shows an exemplary user interface display image 200 of the process automation apparatus 6 operating in accordance with the present invention. The display image 200 is rectangular and represents the visual image depicted on the visual display 30 of the of the process automation apparatus 6 of FIG. 1. The display image 200 includes a graphical representation or flow chart 201 of a defined process. The flow chart 201 is located within a work space 202 that defines a portion of the bottom and left edges of the display image 200. The image 200 also includes a command bar 203 abutting the work space 202, a title bar 204 defining a top edge of the image 200 and further abutting or nearly abutting the command bar 203, and a tool bar 205; abutting a the work space 202 and defining a portion of the bottom and right edges of the image 200. The relationships between the portions of the image 200 are given by way of example, and those of ordinary skill in the art may readily reconfigure the image to suit the purposes of their particular implementation.

The tool bar 205 contains icons that represent the available processing devices, such as, for example, the liquid handler 45 or incubator 38 of FIG. 1. The icons illustrated in the tool bar 205 include a plate holder icon 210, an incubator icon 212, a mixer icon 218, a shaker icon 224 and a plate washer icon 226. There are also flow control icons, including for example a splitter icon 220 and a loop icon 222 to allow flexible definition of a process.

The command bar 203 contains graphical "buttons" that may be selected to perform various file manipulation tasks, such as opening, saving, and deleting files or defined processes. The command bar may further contain insert or delete buttons that allow manipulation of the structure of the flow chart 201.

The flow chart 201 represents an exemplary process that has already been defined by at process manager. The flow chart 201 is defined to represent essentially the same process as that described in Tables 1 and 2. The process represented begins at a start icon 231 and continues substantially downward through a plurality of flow chart icons. Graphical interconnections such as connections 234 and 235 are provided to identify the relative temporal relationships between steps, in other words, the order in which the steps will be performed.

The process manager may define a flow chart such as the flow chart 201 in the following manner. In general, the process manager or user selects screen icons or buttons by moving the mouse 22 from FIG. 1, which causes relative movement of a cursor in the display image 200, until the cursor rests on top of a particular icon or button. The user then "clicks" the mouse, i.e., pushes a button on the mouse, to select the item. A user may furthermore move icons by selecting an icon, holding down the button on the mouse, moving the cursor and icon to the destination, and releasing the button on the mouse. Such moving of an icons is known as "dragging" an icon. User interfaces employing a mouse and "clicking" and "dragging" procedures are well known.

To define a particular process, the user selects and drags icons from the tool box 205 into the work space 202. At the start, the work space 202 contains only the start icon 231, which represents the initial sample to be processed, for example, Sample 1. The user then selects the icon representing the equipment that will perform the first step of the process and drags it under the start icon 231. The ensuing steps are added in a similar manner. When a particular icon is placed in the flow chart, the user may be prompted to provide operating parameters associated with the step to be performed. For example, if the user selects the incubator icon 212, the user may be prompted to provide the temperature of incubation or the duration of the incubation.

Icons selected by the user are by default appended onto the bottom-most icon of the flow chart. In some cases, however, a selected icon is not automatically appended to the bottom-most icon, such as in the case of the supply icon 214. The supply icon 214 represents another sample, substance, or additive that will be mixed into the original sample or processed in parallel to the original sample. Accordingly, instead of simply appending the supply icon 214 to the bottom of the flow chart, the user is prompted to connect the supply icon 214 to an existing flow chart icon which represents the location at which the substance will be mixed with Sample 1 or otherwise added into the process. For example, the supply icon 236 in flow chart 201, which corresponds to Sample 2 of the process defined in Table 1, is connected to the third icon 237.

Moreover, the user may connect multiple icons to a single preceding icon. For example, in the flow chart 201, the icons 238 and 239 are both connected to the preceding icon 237. Such multiple subsequent icons or steps are appropriate when the user desires to perform divergent step sequences on different samples in the process. Consider, for example, the process defined in Table 1, above. After step 3, Sample 1 and Sample 2 are processed differently, as indicated by steps 4, 5 and 6. To achieve this result in the flow chart 201, the user connects two subsequent icons to the icon 237 where the processing will diverge. The user may also select to split a single sample in order to create two samples, using the splitter icon 220.

Software packages capable of performing such operations are often referred to as flow chart editors, and those of ordinary skill in the art could readily either design or incorporate a suitable flow chart editor for use in accordance with the present invention. Such an editor may further include facilities for inserting and deleting icons. In the display image 200, for example, such deletion and insertion facilities are provided as buttons in the command bar 203.

One of the advantages of the present invention is the intuitive representation of multiple sample processing, or multiple task processing, that is described above in connection with FIG. 2. As opposed to a linear representation, such as that shown in Table 1, the display image 200 allows for parallel sequences of processing steps to be defined and displayed in an intuitive manner.

Figure 3:
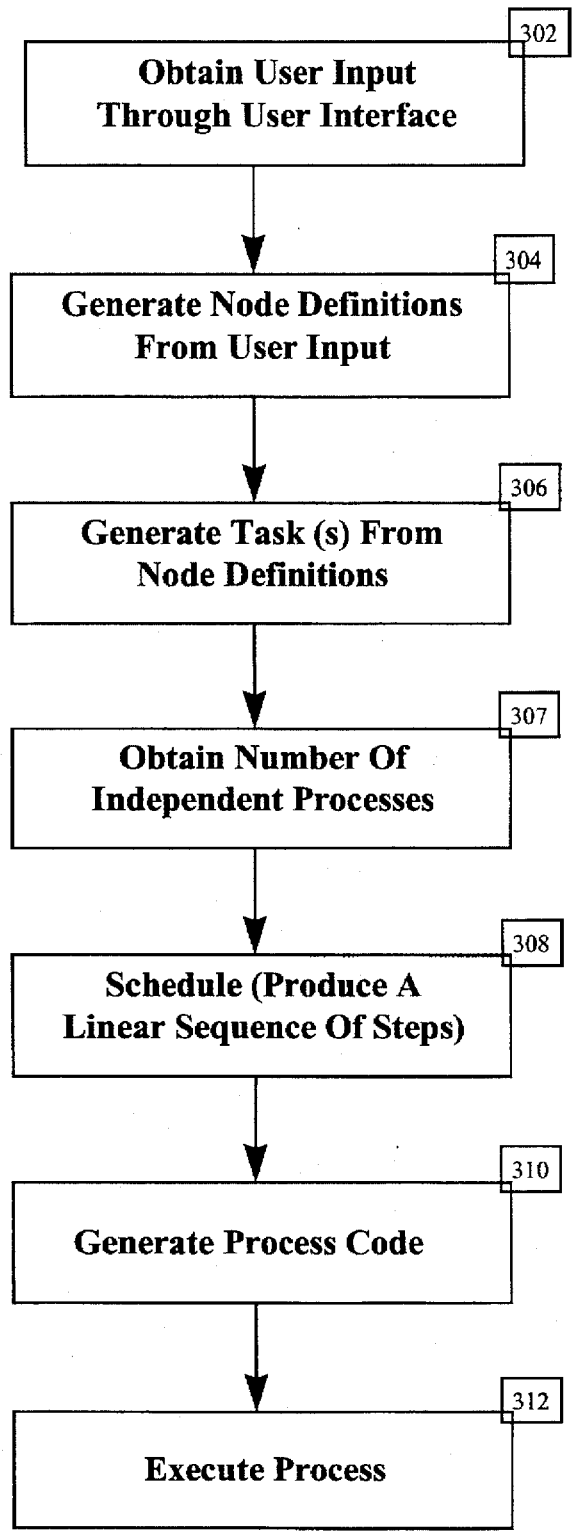
FIG. 3 shows an overview of the procedures executed by a process automation apparatus operating in accordance with the present invention.

FIG. 3 shows an overview of the procedures executed by a process automation device operating in accordance with the present invention. In particular, FIG. 3 illustrates a flow diagram 300 that begins with accepting a process definition from the process manager and ends with the execution of that process. The procedures in flow diagram 300 are performed by a process automation apparatus such as the apparatus 6 illustrated in FIG. 1. The microfiche appendix contains computer source code that when executed by a suitable computer processing unit will perform the operations described in FIG. 3.

The first procedure is to obtain a process definition. Accordingly, in procedure 302, the apparatus obtains user input containing information describing the process through a user interface. The user interface may suitably comprise a keyboard, mouse, or voice-controlled input system and a display. In the exemplary embodiment described herein, the user interface comprises the mouse 22, keyboard 20, and the display 30 illustrated in FIG. 1. The user input generally identifies a plurality of steps to be performed. Each step may include several operations, including processing operations and robot operations for movement of the work sample. The user input also identifies to some degree the order in which the steps will be performed. In this embodiment, the user input may consist of a flow chart such as flow chart 201, wherein each step is represented to an icon. In the alternative, other suitable forms of user input may be employed.

In procedure 304, the apparatus generates nodes and corresponding node definitions from the user input. In a preferred embodiment of the present invention, a node is associated each step in the process. Accordingly, when the user input comprises a flow chart such as the flow chart 201 illustrated in FIG. 2, a node definition is generated for each icon in the display.

A node definition is a data structure that contains information relating to the operations associated with carrying out the step associated with the node. The node definition thus contains information identifying the step to be performed, the processing device that performs the step, robot operations associated with the step, and the duration of each operation associated with the step. The node definition further includes information identifying immediately preceding and immediately subsequent steps.

To generate node definitions in accordance with the preferred embodiment, the process automation apparatus 6 selects a step from the user input and populates a node definition data structure for the selected step. To populate the node definition data structure, the process automation apparatus first retrieves the configuration file associated with the processing device that will perform the selected step. For example, for the icon 233 in FIG. 2, the apparatus would retrieve a configuration file for the incubator.

To this end, each processing device or piece of equipment has a configuration file containing information relevant to that device. In particular, the configuration file includes information relating to the operation performed by the relevant processing device, the position of the processing device on the work bench 25, and the information required by the robot 30 to carry out the transport operations for placing and removing samples to and from the processing device. The configuration file also includes computer-language source code or process code for controlling the processing device.

In any event, the process automation apparatus populates the node definition data structure, in part, with information from the retrieved configuration file. Other portions of the node definition are populated with information from the user input, including the information identifying previous and subsequent steps.

Two exemplary node definitions are provide below for illustrative purposes. Table 2 illustrates a node definition corresponding the second icon 233 of FIG. 2, which is analogous in function to Step 1 of Table 1.

TABLE 2

| Node No: | 3 |
|---|---|
| Parent Node: | 2 |
| Referenced Nodes: | 4 |
| Location Coordinates: | 4, 17 |
| Robot Insert Code: | Orient_4; move_forward {3.4}; move_down {1.0}; release |
| Robot Remove Code: | Orient_4; move_left {5.8}; move_forward {3.4}; move_down {1.0}; grab |
| Insert Duration: | 00:00:08 |
| Duration: | 00:30:00 |
| Remove Duration: | 00:00:07 |
| Device Code: | process_incubate {30} |

Referring to Table 2, the Node Number field contains a reference number. The Parent Node field contains the reference number of the node definition associated with the immediately preceding node (or step) in the process. The Referenced Nodes field indicates any immediately subsequent nodes plus any additional preceding nodes in the process. As shown in Table 2, node 3 is preceded by the step associated with node 2, and is followed by the step associated with node 4.

The next few fields relate to the robot transport operations associated with the node. The Location Coordinates field contains information used by the robot to locate the relevant processing device. The Robot Insert Code field contains program code or procedure names used by the robot to orient the work samples and place the work sample into the processing device. Likewise, the Robot Remove Code field contains program code used by the robot to remove work samples once the processing device has completed operating on the work sample.

Next, the Duration field contains information regarding how long the sample will remain in the piece of equipment for performance of the associated processing operation. Durational information may either come from the configuration file directly, or may be defined by the process manager when the operation (or icon) is added. The Insert Duration and Remove Duration fields contain information regarding the time required to perform the robot transport operations associated with the node. Typically, such insert and remove durational information is provided by the configuration file.

Finally, the Device Code field contains the computer code lines or routine names that identify the desired processing operation performed by the processing device to analyze or effect change upon the work sample.

Table 3 shows an exemplary node definition for the mixing step represented by the icon 237 in FIG. 2, which is analogous to Step 3 of Table 1.

TABLE 3

| Node No: | 4 |
|---|---|
| Parent Node: | 3 |
| Referenced Nodes: | 5, 6, 7 |
| Location Coordinates: | 15, 30 |
| Robot Insert Code: | {from node 3}; Orient_2; move_left {2.1}; move_forward {0.9}; move_down {1.0}; release {from node 5}; Orient_2; move_left {2.1}; move_forward {4.5}; move_down {1.0}; release |
| Robot Remove Code: | {to node 6}; Orient_2; move_forward {0.9}; |

TABLE 3-continued

|  |  |
|---|---|
|  | move_down {1.0}; grab<br>{to node 7}; Orient_2;<br>move_forward {4.5};<br>move_down {1.0}; grab |
| Insert Duration: | 00:00:09 |
| Duration: | 00:01:15 |
| Remove Duration: | 00:00:09 |
| Device Code: | process_mix_2{location_1; 0.10} |

It is noted that the node definition in Table 3 for the mixing step differs in many aspects from the node definition in Table 2. For example, the Robot Insert Code and Robot Remove Code fields reflect the fact that two samples are being inserted into the device. To determine the location of each sample, the user or process manager will typically be required to select which part of the mixer device each sample should be placed. The process manager will typically be prompted for such information during the user input procedure 302 of the flow diagram 300.

Also notable in Table 3 is that the node definition includes three referenced nodes. These referenced nodes correspond to the supply icon 236, the icon 238, and the icon 239, as illustrated in FIG. 2. In this case, the three reference nodes include a preceding node, corresponding to the supply icon 236, and two subsequent nodes, corresponding to the icons 238 and 239.

Node definitions are generally created for each step in the defined process. It will be appreciated that while procedure 304 is located after procedure 302 in the flow diagram 300, such procedures may operate in conjunction with one another. For example, as each icon is selected and appended to the flow chart 201 of FIG. 2, the apparatus may immediately thereafter generate the node definition for that step. In the alternative, the node definitions may be generated after the entire user input is provided.

After the node definitions are developed, then in step 306, the apparatus generates task definitions from the node definitions. A task, as defined herein, includes a sequence of steps that must be performed in an unalterable sequence. If a series of steps may be performed in alternative orders, then the series of steps may not constitute a task.

Thus, for example, the steps represented by icons 232, 233 and 237 in FIG. 2 may represent a task because they must be performed in that order. In contrast, the steps represented by icons 232, 233, 237 and 236 in FIG. 2 do not represent a task because they need not be performed in a particular order. More specifically, the order in which those four steps can be performed without dishonoring the flow chart 201 may be: 232, 236, 233, and 237; 236, 232, 233, and 237; and 232, 233, 236 and 237. Consequently, such steps cannot all be associated with a single task. Such steps may, however, be defined as two tasks, the first task including the steps represented by icons 232, 233 and 237, and the second task including the step represented by icon 236.

Associated with each task is a task definition. The task definition consists of a linear sequence of operations that corresponds to the linear sequence of steps. In other words, the task definition consists of the operations associated with each step of the task. Typically, the operations for each step are identified by the Device Code, Robot Insert Code and Robot Remove Code fields of the step's node definition.

The task definitions also include information identifying any dependencies on other tasks. In particular, a particular task definition will identify if performance of a step of that task depends on the prior performance of a step from another task. Referring again to the exemplary first and second tasks discussed above, the performance of the step represented by icon 237 in the first task is dependent on the performance of the step represented by icon 236 from the second task. As a result, the first task will include information identifying the dependency on the second task.

Consequently, two features of the task definition process according to the present invention is that 1) a task consists of an unalterable sequence of one or more steps and 2) the task definitions include an unalterable sequence of operations as well as the identification of any dependencies on other tasks. The method by which tasks are defined from node definitions is discussed below in further detail in connection with FIGS. 4a and 4b.

In procedure 308, the apparatus generates a schedule of operations from the task definitions. The apparatus may suitably employ a scheduler device that comprises a software package executed by the CPU 10 of FIG. 1. The scheduler generates a schedule consisting of a linear sequence of operations that advantageously allocates the processing devices and the robotic device between the steps (and operations) of the several tasks. The input to the scheduler includes the task definitions and the node definitions associated therewith, which provides the information necessary to generate the advantageous schedule. In particular, the necessary information includes the linear sequence of operations for each task, identification of any intertask dependencies, the processing devices used by each operation and the duration of each of the operations.

The scheduler interleaves the operations of the several tasks using a set of criteria which includes: reducing the time required to perform the defined process, avoiding conflicts in device and robot usage; respecting the order of steps within a task, and respecting intertask dependencies. The scheduler defines a linear sequence of operations of the process, and assigns a start time for each operation. Schedulers having such capabilities are known.

The scheduler preferably also has the capability to allow the process manager to request that several contemporaneous processes be scheduled together. For example, the user may request to run the process defined in the display image 200 of FIG. 2 ten individual times, contemporaneously. The scheduler would then interleave the tasks of all ten processes according to the criteria set forth above. The scheduler would then define a single linear sequence of operations associated with the ten individual processes. Schedulers having such additional capabilities are also known.

In procedure 310, the apparatus generates a process code sequence corresponding to the sequence of operations. In this procedure, one or more lines of codes are typically generated for each operation in the sequence produced by the scheduler. In some cases, the linear sequence of operations is itself a suitable process code sequence. In other cases, the linear sequence of operations must be translated into the proper code language. According to the preferred embodiment, the process code is in the MDS control language available from Sagian, a division of Beckman Instruments, Indianapolis, Ind.

Once the process code is generated in procedure 310, the apparatus may execute procedure 312 in which the process is actually performed. In procedure 312, the apparatus performs the following functions for each line of code in the process code sequence. First, the apparatus identifies the device which is to carry out the processing step identified in the process code line. In other words, because the automated system 5 of FIG. 1 includes several devices, each line of process code must be identified with the device for which it is intended. The apparatus then passes control commands associated with the process code line to the identified device which then carries out the processing step. The apparatus may further provide translation, if necessary, between the process code line and a code language that is compatible with the processing device.

For example, a line of code may include a control command to remove Sample 1 from the plate holder in order to move it to the incubator. In this example, the line of code sent to the robotic device would provide instructions associated with moving the robotic device to Sample 1 and grasping Sample 1.

The present invention as described above provides an intuitive method and apparatus for defining scheduling and performing processes. In contrast to the prior art, the present invention possesses the ability to represent a process as a graphical flow chart which enables process managers to create and edit processes more easily. Moreover, by generating separate tasks from a single process definition the present invention allows the steps of the process to be more advantageously scheduled. Furthermore, by creating comprehensive node definitions for each operation represented by the icons in the graphical representation, critical information required to schedule and encode the steps of the process is readily accessible by the apparatus at all relevant times.

Figure 4A:
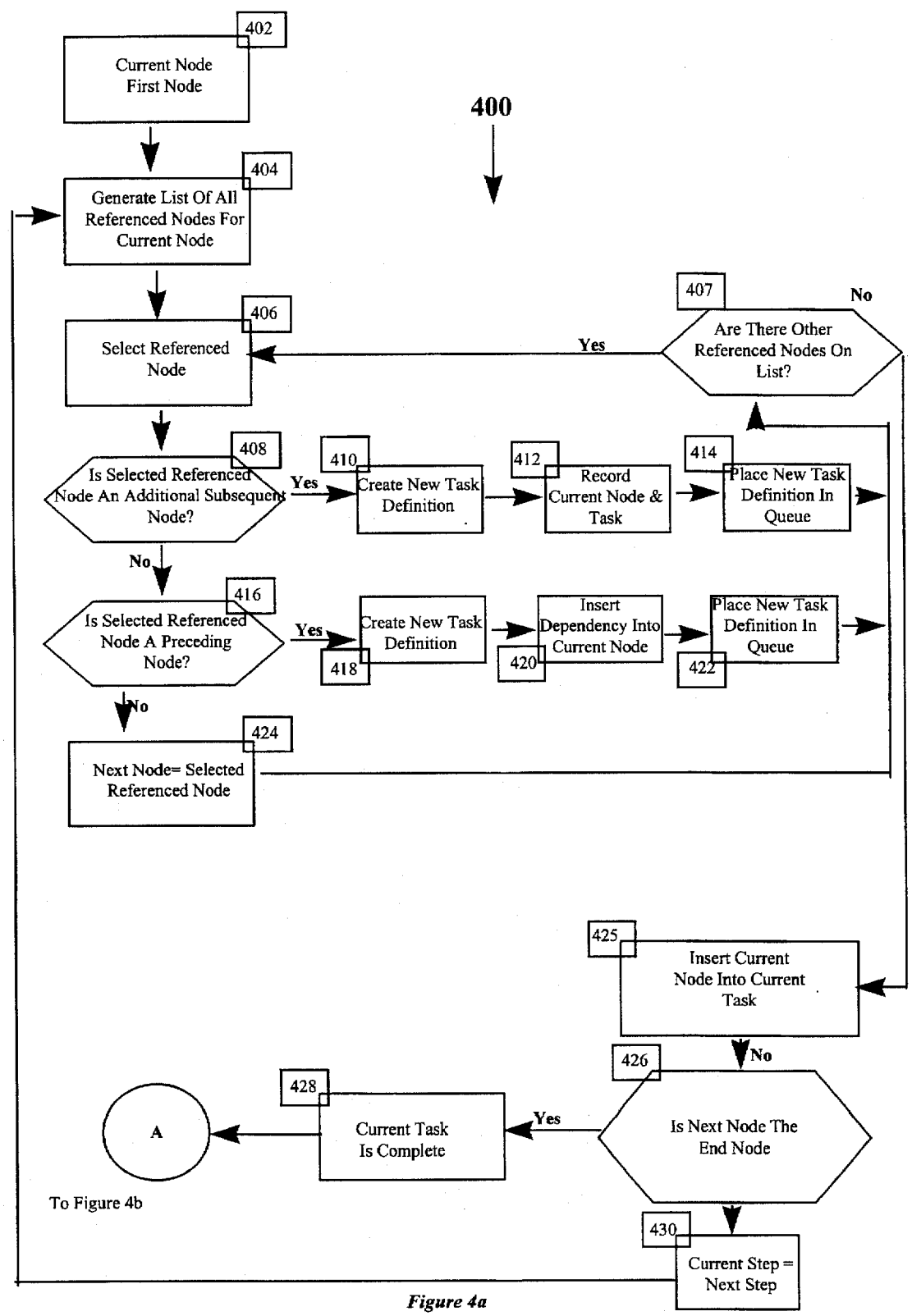
FIGS. 4a and 4b show a flow diagram of the operations performed by the process automation apparatus in performing task generation in accordance with the present invention.

FIG. 4a shows a flow diagram 400, which illustrates in further detail the method of task generation discussed above in connection with procedure 306 of FIG. 3. The method illustrated in the flow diagram 400 receives as input the node definitions and produces the task definitions therefrom. In general, the method illustrated by the flow diagram 400 identifies each node (and its associated step or steps) with a particular task, inserts into the resulting tasks any dependencies on other tasks, and then builds the task definitions by concatenating the operations associated with each step of the task.

The operations in the flow diagram 400 operate upon the individual nodes of the defined process using the node definitions. The method begins with the first node of the process, which is deemed the current node of the current task (402). A list of referenced nodes is then generated for the current node, using information provided in its associated node definition (404). A referenced node from the list its then selected for processing (406).

Next, it is determined if the selected referenced node constitutes an additional subsequent node (408). If the current node has more than one subsequent node, one of the subsequent nodes will be the next node of the current task and all other subsequent nodes are considered to be additional subsequent nodes. Thus, for the icon 237 in FIG. 2, the icon 238 may represent the next node and the icon 240 may represent an additional subsequent node. Typically, the first referenced node that is a subsequent node is not considered to be an additional subsequent node.

If the selected referenced node is determined to be an additional subsequent node, then a new task definition is created that includes the referenced node (410). In addition, information identifying the current node and task is recorded into the newly-created task definition (412). The newly-created task definition is then placed into a subsequent task queue (414), which will be processed later. The method then returns to determine whether the current node has other referenced nodes (407). If not, then the final processing of the current node may be performed (425), which is discussed further below. If, however, the current node has other referenced nodes (407), then a new referenced node from the list is selected (406).

In any event, if the selected referenced node is not determined to be an additional subsequent node (408), then it is next determined whether the selected referenced node is a preceding node (416). It is to be noted that according to the embodiment described herein and illustrated by the node definitions in Tables 2 and 3, the parent node is not included in the list of referenced nodes, and thus any referenced nodes that are preceding nodes are in fact additional preceding nodes. In other words, if the referenced node is a preceding node, then at least two nodes precede the current node.

In any event, if the selected reference node is a preceding node (416), then a new task definition is created that includes the referenced node (418). A dependency upon the new task is then inserted into the current task at the current node (420). This information represents a flag in the current task that indicates that the current task is dependent on the referenced node which is part of the newly-created task definition. In other words, the inserted dependency identifies an intertask dependency. The newly-created task definition is then placed into the preceding task queue (422), and the method returns to determine if there are any other referenced nodes on the list (407), and proceeds accordingly as described above.

If, however, it is determined that the selected referenced node is neither a preceding node (416) or an additional subsequent node (408), then the selected referenced node is determined to be the next node of the current task (424). The method then returns to determine whether there are any other referenced nodes on the list (407), and proceeds accordingly as described above.

If, during the method illustrated by the flow diagram 400, it is determined that there are no more referenced nodes on the generated list for the current node (407), then the current node is appended to the sequence of nodes identified with the current task (425). At this point, the task definition for the current task is updated. In particular, all the operations associated with the current node are appended to the sequence of operations that constitute the current task definition. To this end, the information contained within the Robot Insert Code field, the Device Code field, and the Robot Remove Code field of the node definition is appended to the current task definition.

Thereafter, the method determines whether the next node is the end node of the current task (426). If so, an end routine is executed in which the definition of the current task is deemed to be completed (428). Once the current task is completed, the newly-created task definitions on the preceding task queue and the subsequent task queue are processed, as discussed in further detail in connection with FIG. 4b.

If, however, the next node is not the end of the current task (426), then the current node is set equal to the next node (430) and the method begins to process the new current node as described above, beginning with creating a list of the referenced nodes (404).

Figure 4B:
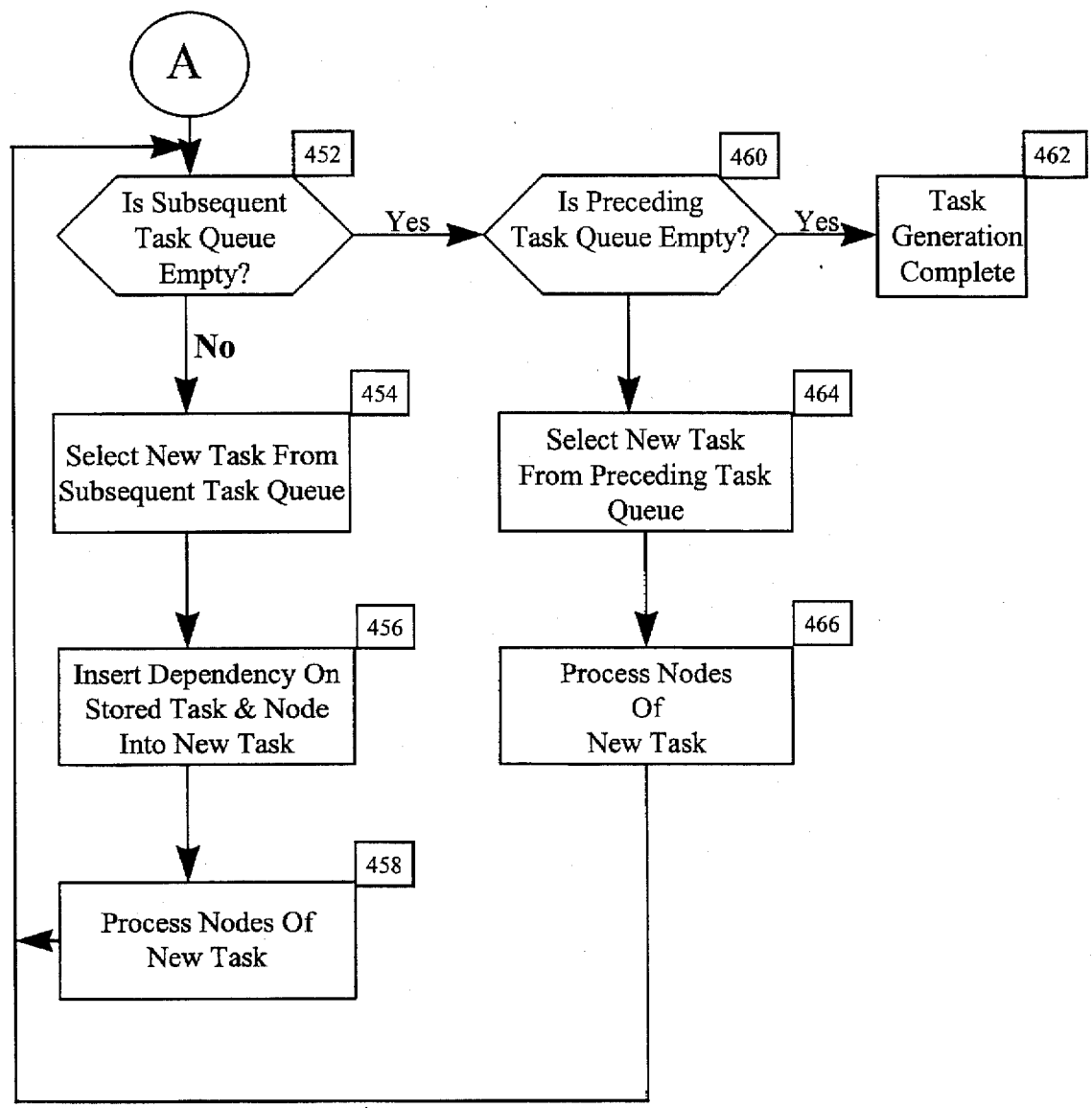

FIG. 4b illustrates the method for processing tasks on the preceding task queue and the subsequent task queue. After the definition of the current task is completed (428 of FIG. 4a), the new task definitions created during the processing of the current task are removed from the queues and processed in a manner similar that illustrated in FIG. 4a. If during the processing of a task on one of the queues, further new tasks are created, such tasks are also queued and subsequently processed.

In FIG. 4b, it is first determined whether the subsequent task queue is empty (452). If not, then a task from the queue is selected (454). Then, the apparatus inserts into the selected task a dependency on the node and task from which the selected task was created (456). As noted above, the identification of this node and task was stored immediately after the new task definition was created (412 of FIG. 4a). Thereafter, the nodes of the new task are processed in a similar manner as that illustrated in FIG. 4a (458). When the end node of the new task is reached, the method returns to process the next queued task (452), if any.

If it is determined that there are no further new tasks on the subsequent task queue, it is then determined if there are any new tasks on the preceding task queue (460). If not, then the task generation process has been completed (462). If, however, the preceding task queue is not empty, a new task definition is selected therefrom (464). It is noted that according to the present embodiment, new preceding tasks are typically associated with supply steps or supply icons, such as the icon 236 of FIG. 2. The selected task is then processed in using method similar to the method disclosed in FIG. 4a (466). To this end, the new task definition on the preceding task queue may contain a reference to the first node of the new task. The method then returns to determine if there are any other tasks in the subsequent task queue (452).

The method illustrated in FIGS. 4a and 4b thus separates the defined process into individual tasks, wherein each task is defined as a plurality of nodes or steps with an unalterable sequence. The resulting task definitions may then be provided as part of the input to the scheduler, in accordance with procedure 308 of FIG. 300.

It is to be noted that the above described embodiments of the present invention are given by way of example. The features and advantages of the present invention may readily be adapted to other systems by those of ordinary skill in the art.

For example, the present invention is not in any way limited to use with laboratory assay equipment. Any process which uses multiple resources may be developed, scheduled and executed using the methods discussed above. Examples include manufacturing processes, or any process for which multitask scheduling may be necessary.

Likewise, the present invention is not limited to the specific data structures, such as the node definitions, that are discussed above in connection with Tables 2 and 3. The relevant information that must be associated with a node is the duration of each step associated with the node, as well as information identifying the immediately preceding and immediately subsequent nodes or steps. For example, the node definition need not include robot code and device code. Such code may instead be generated in other procedures of the process in FIG. 3, such as for example, the code generation procedure 310.

Moreover, while each step in the exemplary embodiment defined above included a plurality of operations, namely a processing operation and the related robot operations a step may alternatively be associated with one operation. In such cases, the sequence of steps defining the tasks would also be the sequence of operations defining the task definition.

Finally, it is to be understood that the method of task generation illustrated in FIGS. 4a and 4b are given by way of example only. The specific choice of implementation of the task generation principles discussed therein will naturally be a matter of design choice. It is, however, preferable to use a method that identifies multiple preceding and/or multiple subsequent steps for a particular step in order to signal the definition of a new task.

What is claimed is:

1. A method for generating a schedule for the performance of a process, the process comprising a plurality of steps, at least one step being performed by at least one of a plurality of devices, the method comprising:
   a) obtaining input containing information defining the process;
   b) generating from the input a series of node definitions, each node definition including duration and device usage information relating to one or more steps, each node definition further including information relating to at least one previous step and at least one subsequent step; and
   c) generating from the series of node definitions a plurality of tasks, each task comprising at least one step of the process, such that every step in the process is associated with at least one of the plurality of tasks;
   d) employing a scheduler to generate a schedule comprising a sequence of the steps of the process based on the generated tasks an allocation of the plurality of devices that avoids device usage conflicts, and the node definitions, said schedule corresponding to the defined process.

2. The method of claim 1 wherein c) further comprises generating a plurality of tasks wherein each task comprises a plurality of steps that must be performed in an unalterable sequence.

3. The method of claim 1 wherein c) further comprises generating a first task having a dependency on a second task, said dependency including a requirement that a preceding step of the second task be performed before a subsequent step of the first task is performed.

4. The method of claim 1 further comprising:
   e) controlling the operation of at least one device to perform at least one step of the process according to the generated schedule.

5. The method of claim 3 further comprising:
   e) controlling the operation of at least one device to perform at least one step of the process according to the generated schedule.

6. The method of claim 1 further comprising:
   e) generating process code from the generated schedule, said process code executable by a control processor; and
   f) employing the control processor to execute the process code in order to control the operation of at least one device to perform at least one step of the process according to the generated schedule.

7. The method of claim 1 wherein a) further comprises graphically representing the input, said graphical representation including at least one icon representing at least one step, and wherein one or more temporal relationships between the plurality of steps are defined by one or more graphical connections.

8. The method of claim 1 wherein a) further includes obtaining input containing information defining an assay for processing and analyzing of one or more work samples.

9. The method of claim 4 wherein e) further comprises controlling the operation of a robotic device to facilitate the performance of one or more steps in the process.

10. The method of claim 1 wherein the steps of the process include a first step associated with a first task, the first step having first and second subsequent steps, and wherein c) further comprises generating a second task including the second subsequent step.

11. The method of claim 1 wherein c) further comprises determining whether a first node definition corresponding to a first step associated with a first task includes information relating to more than one subsequent step;

generating a second task if said first node definition includes information relating to more than one subsequent step, associating a first subsequent step with said first task, and associating a second subsequent step with said second task.

12. An apparatus for representing and performing a process on one or more work samples comprising:
  a) a graphical interface for graphical representation of the process, the process comprising a plurality of steps, at least one step corresponding to an operation performed by at least one of a plurality of devices; and
  b) a first processor connected to the graphical interface and operable to
    generate a sequence of operations based upon the graphically represented process and an allocation of the plurality of devices that avoids device usage conflicts,
    generate a process code sequence representative of the sequence of operations, and
    execute the process code sequence and thereby control the plurality of devices such that the plurality of devices operate on one or more work samples in a manner corresponding to the sequence of operations.

13. The apparatus of claim 12 wherein the graphical interface is operable to represent one or more steps of the process as a graphical icon.

14. The apparatus of claim 12 further comprising input means for facilitating operator manipulation of the graphical interface, thereby allowing an operator to define the graphical representation of the process thereon.

15. The apparatus of claim 12 further comprising a robot operable to transport the one or more work samples between the plurality of devices, and wherein said first processor is further operable to control the robot.

16. The apparatus of claim 12 wherein said graphical interface is operable to
  represent one or more steps of the process as a graphical icon; and
  represent a temporal dependency relationship between a first step and a subsequent step as a graphically-represented connection between a first icon and a second icon.

17. The apparatus of claim 12 wherein said first processor is operable to:
  generate from the graphically-represented process a series of node definitions, each node definition including duration and device usage information relating to at least one step, each node definition further including information relating to at least one previous step and at least one subsequent step; and
  generate the sequence of operations using the node definitions, the sequence of operations corresponding to the graphically-represented process.

18. The apparatus of claim 17 wherein said first processor is further operable to generate a sequence of operations by
  generating from the series of node definitions one or more tasks, each task comprising at least one step of the process, such that every step in the process is associated with at least one task; and
  employing a scheduler to generate the sequence of operations using the generated tasks and the node definitions, and wherein the sequence of operations corresponds to the graphically-represented process.

19. The apparatus of claim 18 wherein said first processor is further operable to
  generate a first task having a dependency on a second task, said dependency including a requirement that a preceding step of the second task be performed before a subsequent step of the first task is performed.

20. An apparatus for representing and performing a process on one or more work samples, the apparatus comprising:
  a) a graphical interface for graphical representation of the defined process, the defined process comprising a plurality of steps;
  b) a plurality of devices, each of the plurality of devices operable to perform an operation on a work sample that is associated with at least one step of the process;
  c) a robotic device operable to facilitate movement of one or more work samples between the plurality of devices; and
  d) a first processor connected to the graphical interface, the plurality of devices, and the robotic device, said first processor operable to
    generate process code representative of a sequence of operations based upon the graphically-represented process and an allocation of the plurality of devices that avoids device usage conflicts, and
    control the plurality of devices based upon the process code, such that the plurality of devices operate on one or more work samples in a manner corresponding to the sequence of operations.

21. The apparatus of claim 20 wherein said graphical interface is operable to represent one or more steps of the process as a graphical icon.

22. The apparatus of claim 20 wherein said first processor is further operable to control the robotic device based upon the process code.

23. The apparatus of claim 20 wherein said plurality of devices includes a liquid handler for use in laboratory assay systems.

24. The apparatus of claim 20 wherein said plurality of devices includes an incubator for use in laboratory assay systems.

25. A method for scheduling a predefined process comprising a plurality of steps, each of said steps associated with at least one subsequent step or at least one preceding step, at least one of the plurality of steps representing an operation on a work sample performed by laboratory equipment, the method comprising;
  defining a first task;
  associating a first step with the first task;
  determining whether there are more than one subsequent steps associated with the first step, and if there are more than one subsequent steps associated with the first step, defining a second task;
  associating a first of said more than one subsequent steps with the first task;
  associating a second of said subsequent steps with the second task; and
  providing the first task and the second task to a scheduling device, said scheduling device operable to define a sequence of steps, said sequence of steps corresponding to the predefined process and advantageously allocating the laboratory equipment between the performance of the steps associated with the first and second tasks.

26. The method of claim 25 further comprising the step of inserting into the second task a dependency on the first task, said dependency associated with the second subsequent step, and wherein the scheduling device is operable to define the sequence of steps based in part on the inserted dependency.

27. A method for scheduling a predefined process comprising a plurality of steps, each of said steps associated with at least one subsequent step or at least one preceding, step, at least one of the plurality of steps representing an operation on a work sample performed by laboratory equipment, the method comprising:

defining a first task;

associating a first step with the first task;

determining whether there are more than one preceding steps associated with the first step, and if more than one preceding steps are associated with the first step, defining a second task;

associating at least one of the preceding steps with the second task; and providing the first task and the second task to a scheduling device, said scheduling device operable to define a sequence of steps, said sequence of steps corresponding to the predefined process and advantageously allocating the laboratory equipment between the performance of the steps associated with the first and second tasks.

28. The method of claim 27 further comprising the step of inserting into the first task definition a dependency on the second task, said dependency associated with the first step, and wherein the scheduling device is operable to define the sequence of steps based in part on the inserted dependency.

* * * * *